United States Patent
Lee et al.

(10) Patent No.: US 8,290,285 B2
(45) Date of Patent: Oct. 16, 2012

(54) METHOD AND RELATED APPARATUSES FOR DECODING MULTIMEDIA DATA

(75) Inventors: Kun-Bin Lee, Taipei (TW); Chi-Cheng Ju, Hsinchu (TW); Chin-Jung Yang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1150 days.

(21) Appl. No.: 12/143,981

(22) Filed: Jun. 23, 2008

(65) Prior Publication Data

US 2009/0317005 A1     Dec. 24, 2009

(51) Int. Cl.
*G06K 9/36* (2006.01)
(52) U.S. Cl. ........................................... 382/233
(58) Field of Classification Search ........... 382/232–253
See application file for complete search history.

(56) References Cited

U.S. PATENT DOCUMENTS

| | | | |
|---|---|---|---|
| 5,999,189 A * | 12/1999 | Kajiya et al. ................. | 382/232 |
| 6,522,326 B1 * | 2/2003 | Deering ........................ | 345/427 |
| 6,553,072 B1 | 4/2003 | Chiang et al. | |
| 6,587,588 B1 * | 7/2003 | Bottou et al. ................. | 382/240 |
| 7,095,907 B1 * | 8/2006 | Berkner et al. ............... | 382/298 |
| 7,136,532 B2 | 11/2006 | Van Der Schaar | |
| 7,187,802 B2 | 3/2007 | Ju | |
| 7,313,281 B2 | 12/2007 | Ju | |
| 2004/0008894 A1 * | 1/2004 | Zeineh ......................... | 382/240 |
| 2004/0114812 A1 * | 6/2004 | Bhaskaran et al. ........... | 382/233 |
| 2007/0098275 A1 | 5/2007 | Lee et al. | |
| 2007/0201752 A1 * | 8/2007 | Gormish et al. ............. | 382/232 |
| 2007/0211055 A1 * | 9/2007 | Stein et al. .................... | 345/428 |
| 2008/0226181 A1 * | 9/2008 | Birtwistle et al. ............ | 382/232 |

* cited by examiner

*Primary Examiner* — Jingge Wu
(74) *Attorney, Agent, or Firm* — Thomas|Kayden

(57) ABSTRACT

A method for decoding compressed multimedia data is disclosed. At least one performance parameter corresponding to a system environment or a display requirement of the compressed multimedia data is first acquired. A rendering flow for the compressed multimedia data according to the at least one performance parameter is then determined dynamically, wherein the rendering flow comprises a specific arrangement of rendering procedures indicating the execution order of the rendering procedures. Then, the compressed multimedia data is decoded with the determined rendering flow so as to display the decoded data as an image data.

18 Claims, 11 Drawing Sheets

| parameter name | value/status |
|---|---|
| Available buffer size | |
| access speed of the storage | |
| data transfer rate | |
| decoding time | |
| CPU speed | |
| ⋮ | ⋮ |

610

| parameter name | value/status |
|---|---|
| Bitstream size | |
| Picture size | |
| Scaling factor | |
| Display quality | |
| ⋮ | ⋮ |

METHOD AND RELATED APPARATUSES FOR DECODING MULTIMEDIA DATA

BACKGROUND OF THE INVENTION

1. Field of the Invention

The invention relates to data decoding, and more particularly, to decoding compressed multimedia data being progressively encoded.

2. Description of the Related Art

To decode compressed multimedia data, such as still or a video image, for displaying/playing in an electronic apparatus, such as a digital camera or a DV camcorder, a decoding/rendering flow may comprise procedures of reading and decompressing the compressed multimedia data, and further performing the decoding procedure, image processing step and displaying the final image. In general, Joint Photographic Experts Group (JPEG) compression and bit-planes compression are two popular coding methods respectively for a still image and a video image applied in many multimedia applications.

JPEG defines how an image is compressed into a stream of data and decompressed back into an image. A JPEG progressive mode available as part of the JPEG standard, in which data is compressed in multiple passes of progressively higher detail quickly, provides a rough approximation of the final image, refining the image in later passes, rather than slowly building an accurate image in a single pass. The standard JPEG image data is arranged with DC components and 8×8 discrete cosine transform (DCT) coefficient blocks running left to right and top to bottom through the image. The progressive mode allows the DC components to be sent first, followed by the DCT coefficients in a low-frequency to high-frequency order. This enables a decoder to reproduce a low quality version of the image quickly, before successive (higher frequency) coefficients are received and decoded.

FIG. 1 shows an embodiment of a conventional JPEG decoding apparatus 100.

The conventional progressive JPEG decoding apparatus 100 comprises a variable length decoding (VLD) unit 110, an image-sized coefficient memory buffer 120, an inverse quantization unit 130 and an inverse DCT (IDCT) unit 140. For the progressive mode, sample blocks of an image are typically encoded in multiple scans through the image. The VLD unit 110 performs a variable length decoding operation to the encoded JPEG bit stream which has multiple progressively encoded scan data and generates variable-length-decoded coefficients to the image-sized coefficient memory buffer 120. The image-sized coefficient memory buffer 120 stores the variable-length-decoded coefficients generated by the VLD unit 110. When collecting all the variable-length-decoded coefficients of a scan, the inverse quantization unit 130 performs an inverse quantization operation and then the IDCT unit 140 performs an inverse DCT operation upon these variable-length-decoded coefficients to generate a partially reconstructed image, whereby the partially reconstructed image can first be displayed. The partially reconstructed image can later be refined progressively when the variable-length-decoded coefficients of other scans are also ready and processed the IDCT operations by the IDCT unit 140.

For the conventional progressive JPEG decoding apparatus, however, an image-sized coefficient memory buffer is needed. Once the image to be reconstructed becomes large (e.g. 65,535 by 65,535 pixels), decoding of the image in a decoding apparatus having memory buffer smaller than the size of the image to be reconstructed fails.

In addition to JPEG progressive mode that divides the bitstream into multiple scans, video data can also be divided into multiple layers (hereinafter referred to as "layered video data"), such as one "base layer" and one or more "enhancement layers". The base layer includes a rough version of the video sequence and may be transmitted using relatively little bandwidth. Typically, the enhancement layers are transmitted at the same time as the base layer, and recombined at the receiving end with the base layer during the decoding process. The enhancement layers provide correction to the base layer, permitting video quality improvement. In general, each enhancement layer is one bit-planes of the difference data. In such an arrangement, each enhancement layer for each picture consists of a series of bits. The enhancement layers are ordered in such a way that the first enhancement layer contains the most significant bits, the second enhancement layer contains the next most significant bits, and so on. Thus, the most significant correction is made by the first enhancement layer. Combining more enhancement layers continues to improve the output quality. Therefore, if each of the transform coefficients is represented by n bits, there are n corresponding bit-planes to be coded and transmitted. In this way, the quality of the output video can be "scaled" by combining different numbers of enhancement layers with the base layer. The process of using fewer or more enhancement layers to scale the quality of the output video is referred to as "Fine Granularity Scalability" or FGS. FGS may be employed to produce a range of quality of output video.

FIG. 2 is a block diagram of a conventional FGS decoding apparatus.

The decoding apparatus 200 comprises a base layer (BL) decoder 210 and an enhancement layer (EL) decoder 230. The BL decoder 210 comprises a variable length decoding (VLD) unit 212, an inverse quantization ($Q^{-1}$) unit 214, an inverse discrete cosine transform (IDCT) 216, a motion compensation unit 218, a frame memory 220 and an adder 222. The EL decoder 230 comprises a bit-planes VLD unit 232, a bit-planes shift unit 234, an IDCT unit 236 and an adder 238.

VLD unit 214 receives a BL bitstream and performs a VLD operation thereto to provide a decoded data and motion vectors. The decoded data and the motion vectors are sent to the inverse quantization ($Q^{-1}$) unit 214 and the motion compensation unit 218 respectively. Then, the inverse quantization ($Q^{-1}$) unit 214 outputs the DCT coefficient data to IDCT unit 216. An IDCT operation is then performed by the IDCT unit 216 to generate video frames to adder 222. Frame memory 220 receives the video frames from adder 222 or clipping 224 and stores the frame as a reference output. The reference output is then fed back into motion compensation unit 218 for use in generating subsequent base layer video frames. The motion compensation unit 218 receives the motion vectors and BL frame data from the BL frame memory 220, and performs motion compensation on the BL frames in memory 220 to provide additional frames to the adder 222. The decoded BL video frame is output from adder 222 to the BL frame memory 220 and the EL decoder 230.

The bit-planes VLD unit 232 of the EL decoder 230 receives the enhancement layer bit stream to provide DCT coefficient data. The inverse DCT unit 236 performs the IDCT operation and outputs the EL frame data that may subsequently be combined with base layer video frame by adder 238 to generate enhance video, which may be stored in a reconstructed frame buffer or sent to a displaying unit. In the decoding apparatus 200, all bit-planes received are decoded. For example, if 7 bit-planes are received, 7 bit-planes are decoded. The decoding of the decoding apparatus 200, however, may be stopped after receiving and decoding a specific number of bit-planes in order to reduce the complexity. For example, if 7 bit-planes are received, the decoding can be stopped after 5 bit-planes have been decoded. However, discarding bit-planes may affect visual quality.

As shown in FIGS. 1 and 2, decoding progressively encoded multimedia data requires a decoding/rendering flow that comprises a variety of procedures in sequence, such as VLD, IDCT and scaling (i.e. scaling the decoded data to fit to display) procedures. Conventionally, the procedures of the decoding/rendering flow for decoding the multimedia data are arranged in a fixed order to save costs. Under different system conditions, the performance for decoding and displaying multimedia data being progressively encoded may become poor and cause decreasing of the system performance.

It is therefore desired to provide methods and apparatus for rendering an image being progressively encoded quickly and effectively under a limited system requirement and provide a way to dynamically change the rendering method according the system environment, such as image size, display size, and storage requirement.

BRIEF SUMMARY OF THE INVENTION

The invention provides a method for rendering compressed multimedia data. First, at least one performance parameter corresponding to a system environment or a display requirement of the compressed multimedia data is acquired. A rendering flow for the compressed multimedia data is then dynamically determined according to the at least one performance parameter, wherein the rendering flow comprises a specific arrangement of rendering procedures indicating the execution order of the rendering procedures. Next, the compressed multimedia data are decoded with the determined rendering flow so as to display decoded data as image data.

The invention also provides a method for decoding compressed multimedia data. The compressed multimedia data is progressively encoded and comprises a plurality of bitstream portions. The method comprises acquiring at least one performance parameter corresponding to a system environment or a display requirement of the compressed multimedia data. Next, a specific number of the plurality of bitstream portions being decoded is dynamically determined according to at least one performance parameter. Then, the compressed multimedia data is decoded according to the specific number of the plurality of bitstream portions being decoded so as to display the decoded data as the image data.

The invention further provides a decoding apparatus for decoding compressed multimedia data. The decoding apparatus comprises an information supply unit, a determination unit and a processing unit. The information supply unit provides at least one performance parameter corresponding to a system environment or a display requirement of the compressed multimedia data. The determination unit acquires the at least one performance parameter corresponding to the system or the display requirement of the compressed multimedia data and dynamic determines a rendering flow for the compressed multimedia data according to the at least one performance parameter, wherein the rendering flow comprises a specific arrangement of rendering procedures indicating the execution order of the rendering procedures. The processing unit decodes the compressed multimedia data with the determined rendering flow so as to display the decoded data as image data.

BRIEF DESCRIPTION OF THE DRAWINGS

The invention can be more fully understood by reading the subsequent detailed description and examples with reference to the accompanying drawings, wherein:

FIG. 6 shows an embodiment of the performance parameters according to the invention;

DETAILED DESCRIPTION OF THE INVENTION

Figure 1:
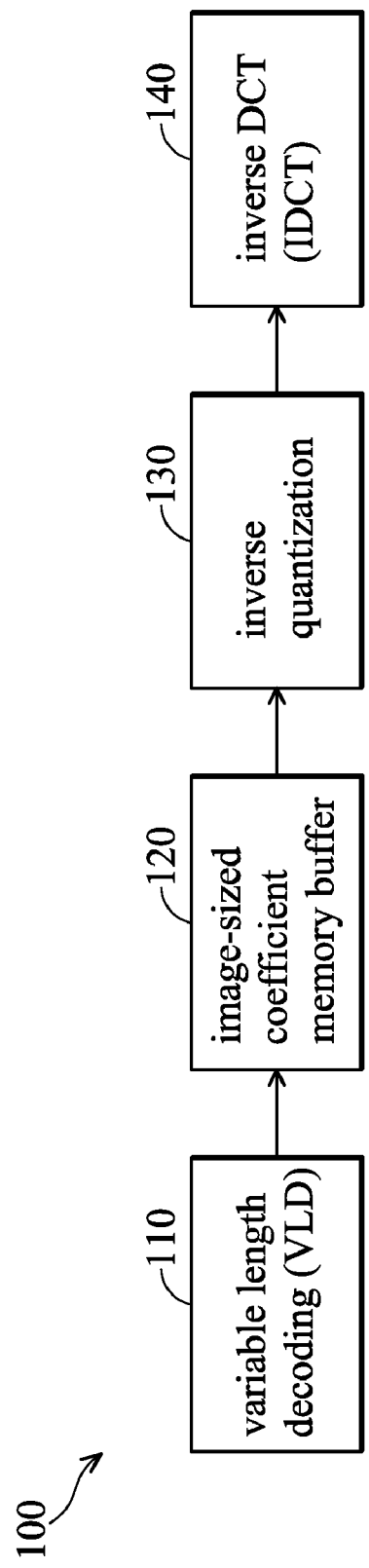
FIG. 1 shows an embodiment of a conventional JPEG decoding apparatus.

The following description is of the best-contemplated mode of carrying out the invention. This description is made for the purpose of illustrating the general principles of the invention and should not be taken in a limiting sense. The scope of the invention is best determined by reference to the appended claims.

The invention is now described with reference to FIGS. 3 through 9, which generally relate to decoding compressed multimedia data or bitstream. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the invention. The following detailed description is, therefore, not to be taken in a limiting sense. It should be understood that many of the elements described and illustrated throughout the specification are functional in nature and may be embodied in one or more physical entities or may take other forms beyond those described or depicted.

The invention provides rendering methods and systems for decoding compressed multimedia data being progressively encoded, especially, for compressed multimedia data encoded in multiple scans or multiple portions so that a rough resolution image, either in spatial domain or in temporal domain, is displayed first when a port scans are decoded and a more detailed image is displayed later when information of more scans is obtained. In addition, the term "rendering" in the present invention should be interpreted as decoding and capable of displaying the decoded result. Performance parameters corresponding to the system environment or the display requirement are acquired first before performing the decoding/rendering procedures. One or more performance parameters are utilized to determine a rendering flow that indicates a specific arrangement of the rendering procedures for decoding the received compressed multimedia data. Then, the received compressed multimedia data is decoded with the determined rendering flow to display the image. Thus, according to the invention, a suitable rendering flow may be determined or selected dynamically based on the performance parameters indicating the system environment status or the display requirement of the compressed multimedia data, improving the display performance of the electronic system.

Moreover, the invention further provides a method for decoding compressed multimedia data to generate reconstructed image data. With the acquired performance parameter corresponding to a system environment or a display requirement of the compressed multimedia data, a specific number of the plurality of bitstream portions being decoded is dynamically determined so as to decode compressed multimedia data using the determined specific number of the plurality of bitstream portions and display the decoded data as the image data.

Figure 3:
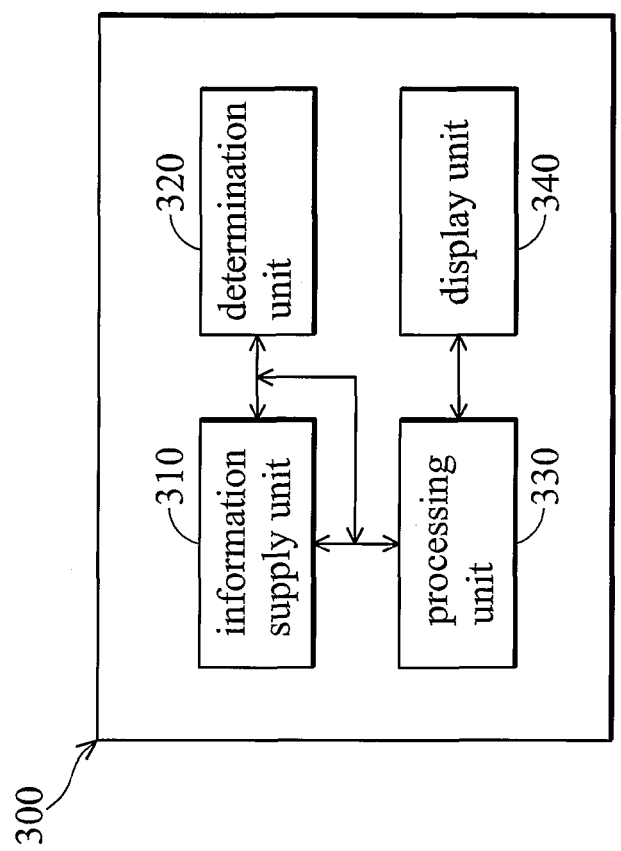
FIG. 3 shows an embodiment of a decoding apparatus for decoding compressed multimedia data according to the invention.

FIG. 3 shows an embodiment of a decoding apparatus 300 for decoding compressed multimedia data according to the invention. The decoding apparatus 300 comprises an information supply unit 310, a determination unit 320, a processing unit 330 and a display unit 340. The decoding apparatus 300 may be implemented in a player device, such as a DVD player or a handset, to decode the compressed multimedia data. Here, the compressed multimedia data may be, for example, a JPEG progressive stream under JPEG standard or layered video data under MPEG standard (e.g. FGS) as discussed.

The information supply unit 310 provides performance parameters corresponding to system environment or performance parameters corresponding to display requirement of the compressed multimedia data. The performance parameters correspond to the hardware of the system, such as available working memory size, CPU speed, access speed of the storage device where the compressed multimedia data is stored, or display requirement for the displayed image, such as a display quality, a scaling factor, or the picture size of the compressed multimedia data. Detailed description of the performance parameters thereof is provided below, and only briefly described herein.

The determination unit 320 acquires the desired performance parameter, such as available working memory size or CPU speed of the system, from the information supply unit 310, and dynamically determines a rendering flow for decoding the compressed multimedia data according to the acquired performance parameter. The rendering flow comprises a specific arrangement of rendering procedures, wherein the specific arrangement of the rendering procedures indicates the execution order of each of the rendering procedures to be performed. For example, if the rendering procedures include procedures A, B, C and D, one arrangement of the rendering procedures may be A, C, B and D while another arrangement of the rendering procedures may be B, A, C and D performed in sequence, i.e. procedure B is performed first, followed by the procedure A, C and procedure D is performed last. Here, determining a rendering flow for decoding the compressed multimedia data comprises selecting a flow indicating the execution order of each of the rendering procedures so as to decode the compressed multimedia data efficiently and quickly. After the rendering flow is determined by the determination unit 320, the compressed multimedia data is then decoded by processing unit 330 with the determined rendering flow. The processing unit 330 can include the scaling processing, rotation processing or blending processing. Therefore, the compressed multimedia data is decoded and the decoded compressed multimedia data displayed by the display unit 340.

Figure 4:
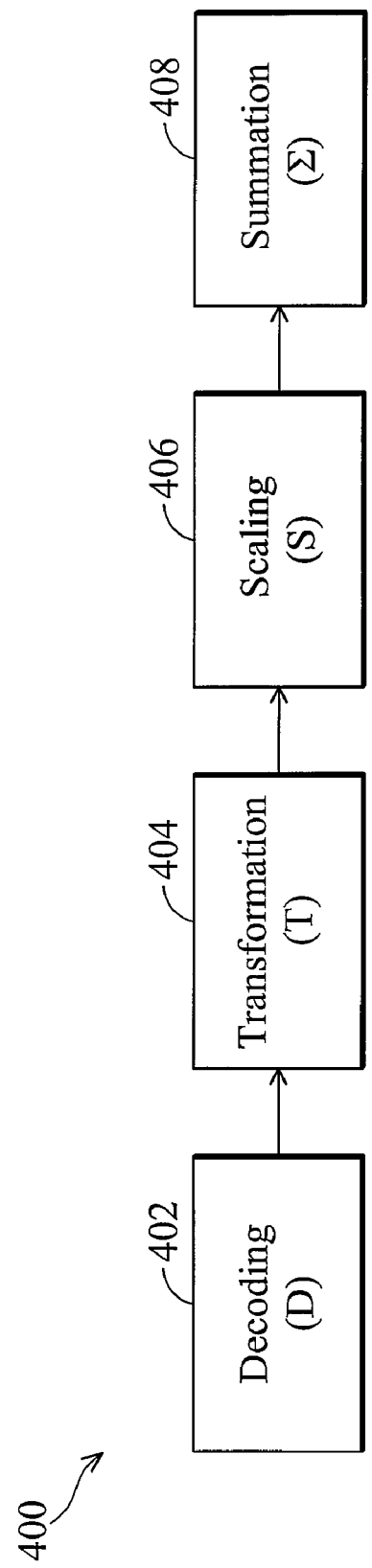
FIGS. 4 and 5 show two embodiments of the rendering flows according to the invention.
Figure 5:
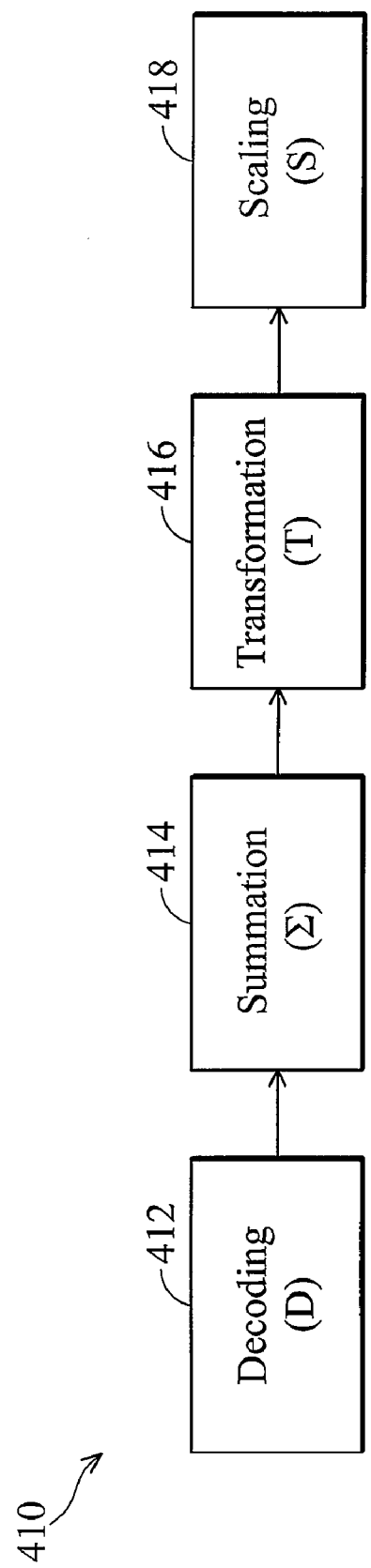

FIGS. 4 and 5 show two embodiments of the rendering flows according to the invention. The rendering flows shown in FIGS. 4 and 5 are applied for compressed multimedia data having multiple portions. FIG. 4 illustrates a rendering flow for the rendering procedures that successively read each portion of the compressed multimedia data once (hereinafter referred to as "one-pass rendering flow") while FIG. 5 illustrates another rendering flow for the rendering procedures that does not need to successively read each portion of the compressed multimedia data while decoding (hereinafter referred to as "multi-pass rendering flow"). A summation, one of the combining procedures, labeled as "Summation" ($\Sigma$) indicates a procedure corresponds to summing operation. For example, the summation procedure may be an operation to sum all or some of the temporal decoded results, but is not limited thereto. A transformation procedure labeled as "Transformation" (T) indicates a procedure corresponds to transformation operation, such as inverse discrete cosine transform (IDCT) operations. A scaling procedure labeled as "Scaling" (S) indicates a procedure corresponds to scaling the decoded picture to fit to display. A decoding procedure labeled as "Decoding" (D) indicates a procedure corresponds to decoding the compressed multimedia data with a specific rule, such as performing the decoding using Huffman variable length decoding or Arithmetic decoding in JPEG standard. It is to be understood that the summation procedure, the transformation procedure, the scaling procedure and the decoding procedure of the rendering procedures are described here for further explanation, but are not limited thereto. In other words, other procedures, such as an inverse quantization procedure, may also be arranged in the rendering flow.

Figure 10:
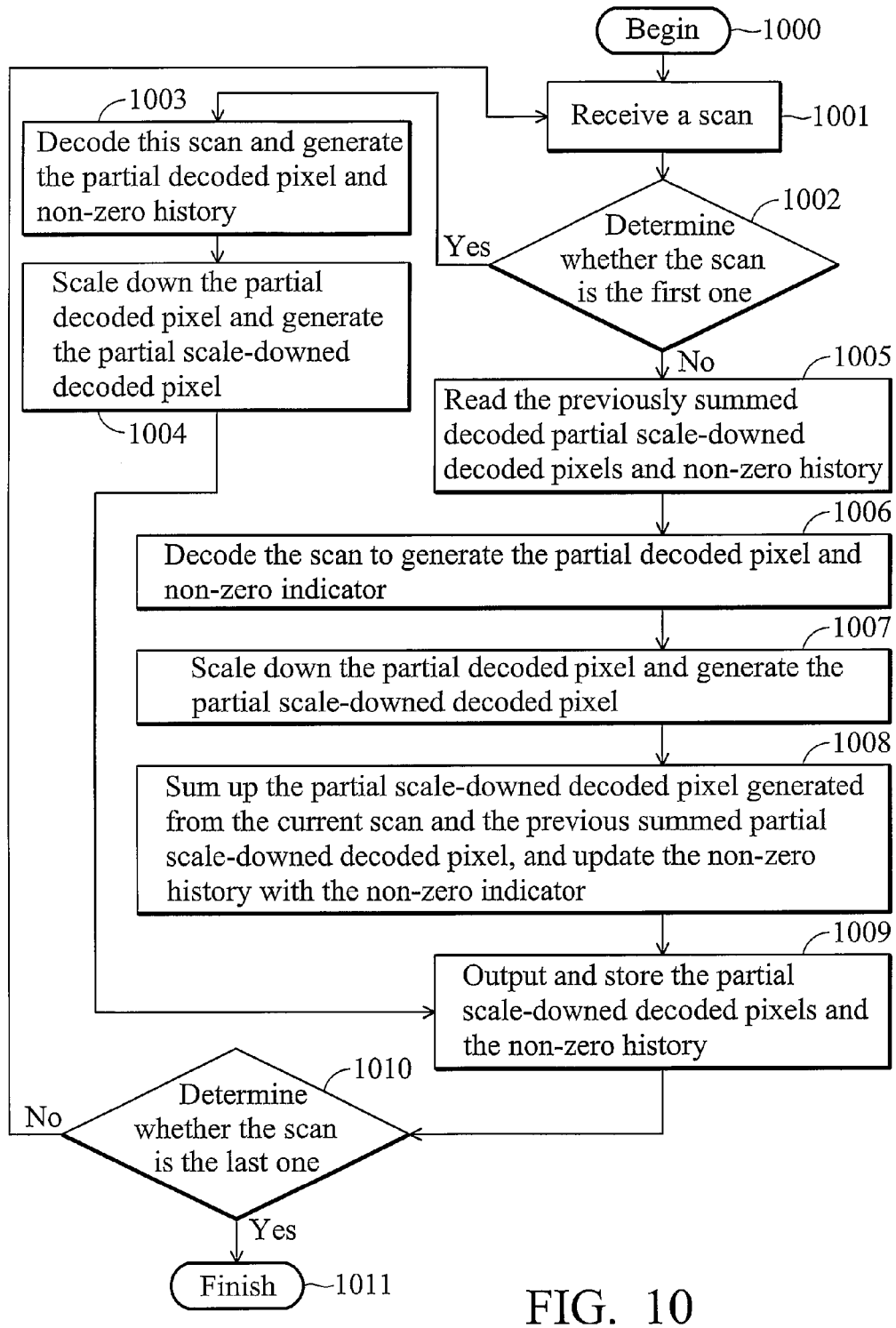
FIGS. 10 and 11 show two embodiments of the rendering flows.
Figure 11:
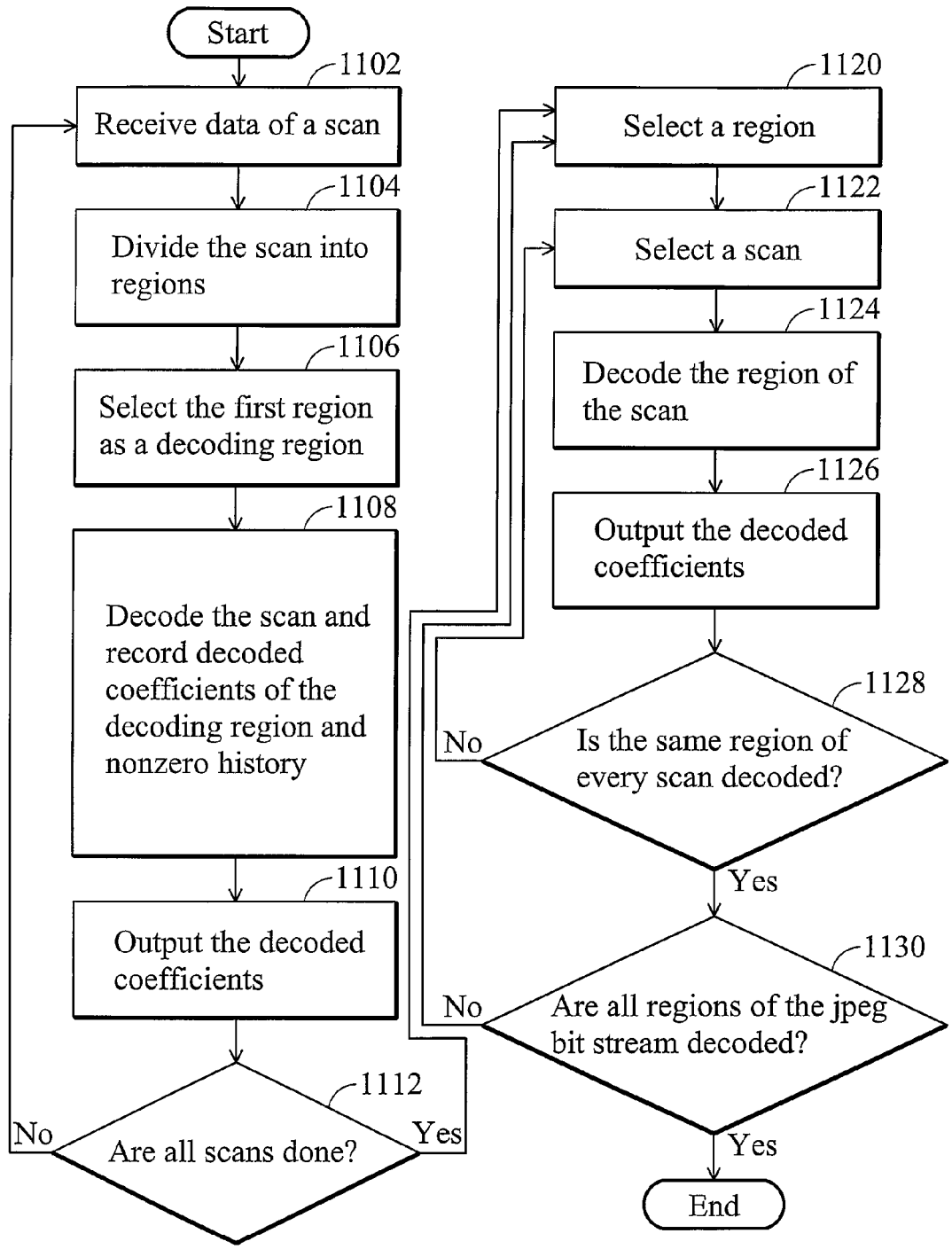

Referring to FIG. 4, a one-pass rendering flow 400 is illustrated. The one-pass rendering flow 400 includes four rendering procedures 402-408. Each rendering procedure of the one-pass rendering flow 400 is performed in sequence from left to right. That is, a decoding procedure 402 (e.g. Huffman variable length decoding) is first applied to generate a decoded result. Secondly, a transformation procedure 404 (e.g. IDCT) is performed on the decoded result to generate a transformed result. Next, a scaling procedure 406 is performed on the transformed result to generate a scaled result. Finally, a summation procedure 408 is performed on the scaled result to display the image data. According to the one-pass rendering flow 400, since the summation procedure 408 will be performed later, a large number of the operations and fewer data transfer from the storage unit are needed. Embodiment of the decoding method applied such one-pass rendering flow 400 can be shown in FIG. 10. In FIG. 10, a progressive JPEG decoding method and a progressive decoder thereof, which directly decode (D) and transform (T) each scan of data to generate the partial decoded pixel and the corresponding non-zero indicator, down-sample the partial decoded pixel and generate a partial down-sampled decoded pixel (S), combine accumulatively the partial decoded pixels generated from each scan ($\Sigma$), update the non-zero history with the non-zero indicator, and output the final integral decoded pixels as the complete image data after all the scans are decoded is disclosed. Similarly, a multi-pass rendering flow 410 is illustrated with reference to FIG. 5. The multi-pass rendering flow 410 includes four rendering procedures 412-418. Each rendering procedure of the multi-pass rendering flow 410 is performed in sequence from left to right, i.e. from 412 to 418. That is, the execution order of the multi-pass rendering flow 410 is the decoding procedure (D) 412, the summation procedure ($\Sigma$) 414, the transformation procedure (T) 416 and the scaling procedure (S) 418. Embodiments of the decoding method applied such multi-pass rendering flow 410 is illustrated in FIG. 11, which discloses a processing unit receiving the JPEG bit stream and outputting the image data by executing a method for JPEG decoding, dividing a progressive JPEG image into different regions, decoding the regions individually (D), summing up decoded result of all scans to generate a summation result (Σ), IDCTing the summation result to generate a transformation result (T) and scaling the transformation result to fit to display (D), wherein the buffer size required for decoding each region is reduced.

According to the multi-pass rendering flow 410, since the summation procedure is performed earlier, the number of operations needed thereby is less than that for the one-pass rendering flow 400 while the number of data transfers from the storage unit for the multi-pass rendering flow 410 is larger than that for the one-pass rendering flow 400.

Please note that the summation procedure is for illustration of combining procedure, and it should not be taken as the limitation of the present invention. For example, assuming $B_t[i][j]$ is the partial scaled decoded pixel and $A_{t-1}[i][j]$ is the previous summed partial scaled decoded pixel. This combining procedure is an example as illustrated in FIG. 10. After the combining procedure, the $A_t[i][j]$ is generated as following:

$$A_t[i][j] = B_t[i][j] + A_{t-1}[i][j]$$
$$= B_t[i][j] + (B_{t-1}[i][j] + A_{t-2}[i][j])$$
$$= B_t[i][j] + (B_{t-1}[i][j] + B_{t-2}[i][j] + A_{t-3}[i][j])$$
$$= B_t[i][j] + (B_{t-1}[i][j] + B_{t-2}[i][j] + \ldots + A_0[i][j])$$

Another example of combining procedure, assuming Q[i] is in a predetermined order (e.g. zigzag scan order) within a block, using a 8×8 block and i=0~63 for illustration. In addition, the first scan may contain datum Q[0]~Q[10], the second scan may contain datum Q[11]~Q[36], the third scan may contain datum Q[37]~Q[40], and the fourth scan may contain datum Q[41]~Q[63]. Through the combining procedure for the first scan and the second scan, the output are generated as Q[0]~Q[36]. Through the combining procedure for the first, second and third scans, the result becomes Q[0]~Q[40]. Through the combining procedure for the first, second, third, and fourth scans, the result becomes Q[0]~Q[63]. Since the data in each scan are exclusive, there is no need to perform real computing operations on Q[i] during combining procedure. Another example of combining procedure, assuming Q[i] is in a predetermined order (e.g. zigzag scan order) within a block using a 8×8 block and i=0~63 and each datum contains 8-bit data for illustration. In addition, the first scan may contain datum bit plane 0 of Q[0]~Q[63], the second scan may contain datum bit planes 1-3 of Q[0]~Q[63], the third scan may contain datum bit plane 4 of Q[0]~Q[63], and the fourth scan may contain datum bit planes 5-7 Q[0]~Q[63]. Through the combining procedure for the first scan and the second scan, the output are generated as bit planes 0-3 of Q[0]~Q[63]. Through the combining procedure for the first, second and third scans, the result becomes bit planes 0-4 of Q[0]~Q[63]. Through the combining procedure for the first, second, third, and fourth scans, the result becomes bit planes 0-7 of Q[0]~Q[63]. Although the data in each scan are exclusive, the shifting is still needed for combining with logic OR operation and summation operation during the combining procedure. Because the first scan contains only bit plane 0; thus, the decoded data obtained after the second scan process need to shift 1 bit left and the decoded data obtained after the third scan process need to shift 4 bits left, and the logic OR operation or the summation operation are needed to perform for the combining. The combining procedures as known by one who works in the relevant field should all be applied to the present invention for interpreting of the combining procedure.

FIG. 6 illustrates an embodiment of the performance parameters according to the invention. As shown, a performance parameter table 600 is provided by the information supply unit 310. The performance parameter table 600 comprises a sub-table 610 recording the performance parameters corresponding to system environment and sub-table 620 recording the performance parameters corresponds to display requirement of the compressed multimedia data. The performance parameters of the system environment in the sub-table 610 may be, for example, CPU speed, available working memory size (available buffer size), which indicates the memory size remaining for the decoding procedure; bitstream size, which may comprise the size of the displayed image and user defined information (e.g. Global Position System (GPS) info), access speed of the storage unit, which indicates latency of accessing the storage unit (not shown), data transfer rate of the storage unit; and decoding time which indicates the time estimated for completing the rendering flows. The performance parameters of the display requirement sub-table 620 may be, for example, picture size, indicating the size of whole displayed image, scaling factor, indicating the ratio between displayed image and the picture size, and desired display quality. The value of each performance parameter may be varied and updated dynamically depending on system environment status and/or display requirement, and can be acquired from the sub-table 610 and 620. Thus, the system environment status/display requirement may be monitored by checking value of the performance parameter in the performance parameter table 600. In addition, the performance table 600 may be represented in other form, such as implementing by a register setting, or a storage unit.

Figure 7:
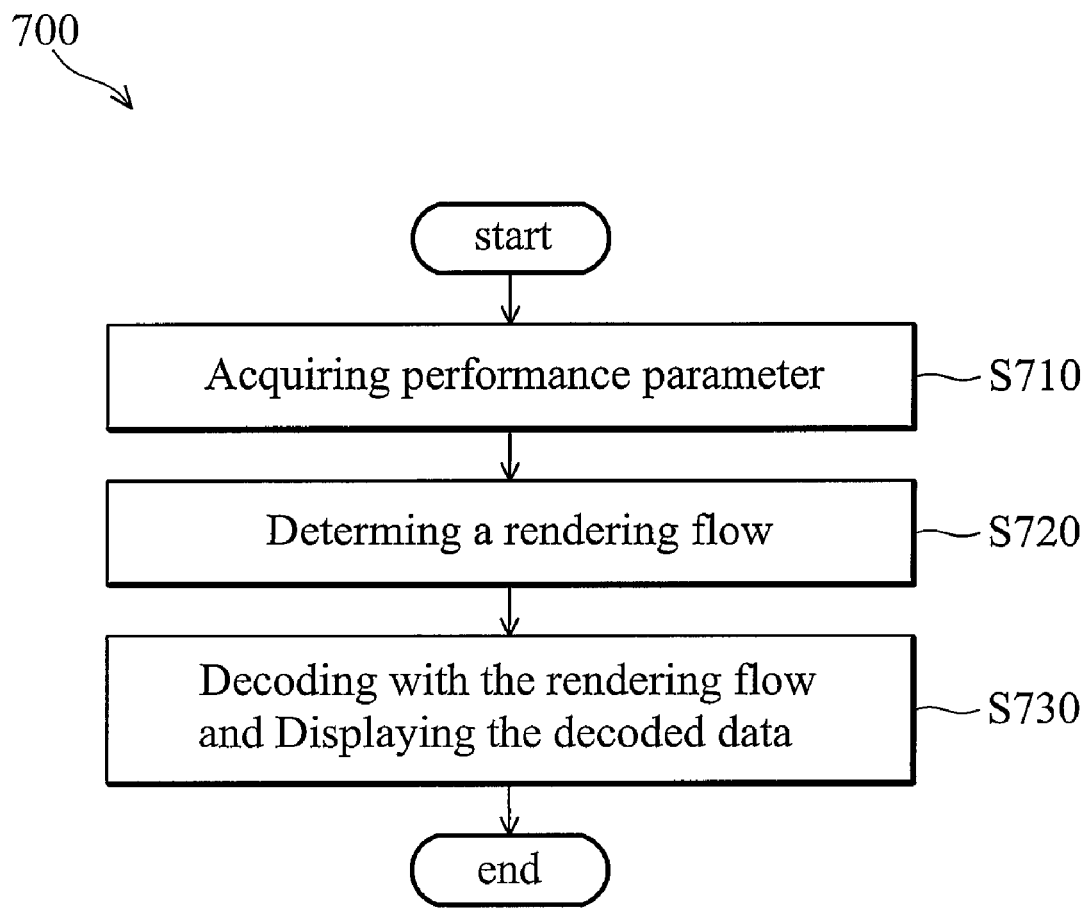
FIG. 7 is a flowchart of an embodiment of a method for decoding compressed multimedia data according to the invention.

FIG. 7 is a flowchart of an embodiment of a method for decoding compressed multimedia data according to the invention. Referring to both FIG. 3 and FIG. 7, at least one performance parameter corresponding to a system environment or a display requirement of the compressed multimedia data is acquired from the information supply unit 310 (step S710). Subsequently, a rendering flow for the compressed multimedia data is determined dynamically by the determination unit according 320 to the at least one acquired performance parameter (step S720). The rendering flow comprises a specific arrangement of rendering procedures as discussed. Then, the compressed multimedia data is decoded with the rendering flow determined in step S720 so as to display the final image (step S730).

Figure 8:
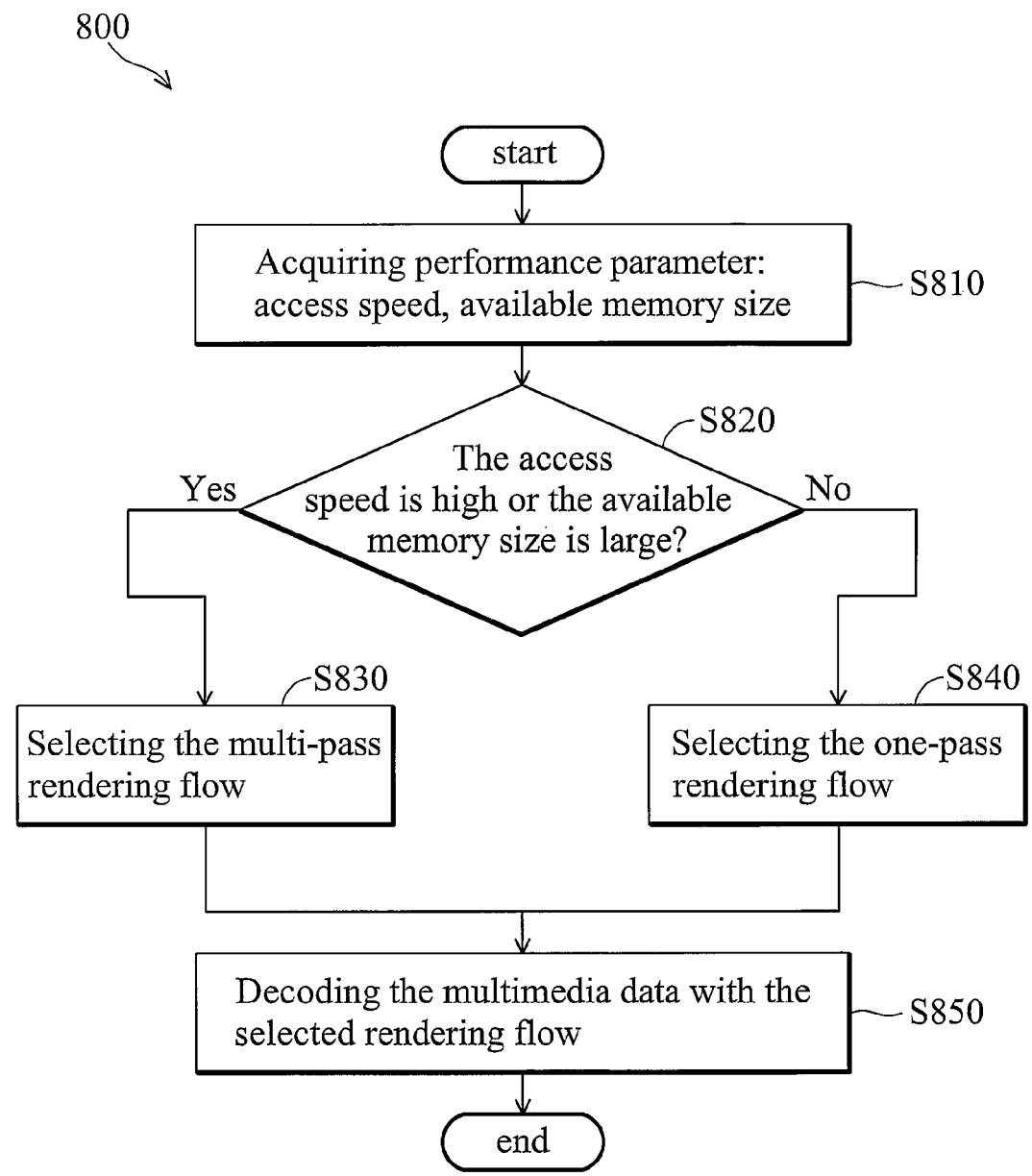
FIG. 8 is a flowchart of an embodiment of a method for decoding an compressed multimedia data according to the system performance parameters.

FIG. 8 is a flowchart of an embodiment of a method for decoding compressed multimedia data according to the system performance parameters. In this embodiment, for example, if the system performance parameters used for determining the rendering flow are available memory size and access speed of the storage unit storing the multimedia data, and the rendering flows to be selected are the one-pass rendering flow and the multi-pass rendering flow. Detailed description of rendering flows and specific arrangement thereof is provided previously, and only briefly described herein. It is to be understood that, although only two system performance parameters and two rendering flows are used here, the invention is not limited thereto.

In step S810, in order to select an optimal rendering flow, current values of the system performance parameters access speed of the storage unit and available memory size are acquired. For example, the storage unit may be a memory within the decoding apparatus or flash card (e.g. SD or CF card), CD or DVD, and the access speed are 39 Mbits/sec, 26

Mbits/sec, 16 Mbits/sec and 800 Mbits/sec for DVD, CD, SD card and SDRAM respectively. Thus, the multimedia data may be read from the memory within the decoding apparatus or read from an external removable device (e.g. Flash cards) to the decoding apparatus via a connected wired/wireless network. The storage unit may be determined as a high speed storage unit (e.g. a DVD), if the access speed thereof is fast enough. In step S820, it is determined whether the access speed of the storage unit (e.g. memory) is high or the available memory size is large. If so, the flow proceeds to step S830; otherwise (No in step S820), the flow proceeds to step S840. In the environment of step S830, the number of the operations is most time consuming. As discussed, the number of operations needed for the multi-pass rendering flow is less than that for the one-pass rendering flow. Hence, applying the multi-pass rendering flow to decode the image file would be faster than applying the one-pass rendering flow to do the same. So, in step S840, the multi-pass rendering flow is selected as optimal rendering flow to be applied. Alternatively, if the access speed of the storage unit (e.g. SD card) is determined as low or the available memory size is determined as small, while reading the image file from the storage unit or to the working memory, the data transfer from the storage unit will be required longer time. In such environment, data transfer from the storage unit is time-consuming. As discussed, the number of data transfers needed for the one-pass rendering flow is less than that for the multi-pass rendering flow. Hence, applying the one-pass rendering flow to decode the image file is faster than applying the multi-pass rendering flow to do the same. Therefore, step S820 selects the one-pass rendering flow, as shown in step S840, as optimal rendering flow to be applied. Subsequently, in step S850, the image file is decoded by the selected optimal rendering flow.

Using the decoding method, a suitable rendering flow may be determined or selected based on the reference to performance parameters indicating the system status or the display requirement, so the time needed for completing the decoding can be significantly reduced and the encoded compressed multimedia data can be decoded and displayed quickly.

In addition, while the decoding apparatus is utilized by an integrated circuit chip, the performance parameters may not be determined in advance before performing the rendering flow. For example, the image file to be displayed may be stored in a CD or a Flash card, the image file may be read to the system through a wired or wireless communication network, or the picture size may be large or small. Further, the decoding apparatus may be equipped with different chips with different hardware configurations, such as different working memory size. Using the method of the invention, the rendering flow for decoding the compressed multimedia data can be dynamically adjusted or selected so that the performance of displaying the compressed multimedia data can be improved.

It is to be noted that, the present invention is not only able to be applied to the filed of processing each portion of the bitstream in a frequency domain (e.g. JPEG standard), but also able to be applied to any fields or standards for processing each portion of the bitstream in a spatial domain (e.g. MPEG FGS standard). Therefore, the invention can be applied to any standard that utilizes multiple portions of the bitstream to reconstruct a single image to select or arrange a rendering flow according to the system environment status and display requirements at that time to speed display time and improve display performance.

Figure 2:
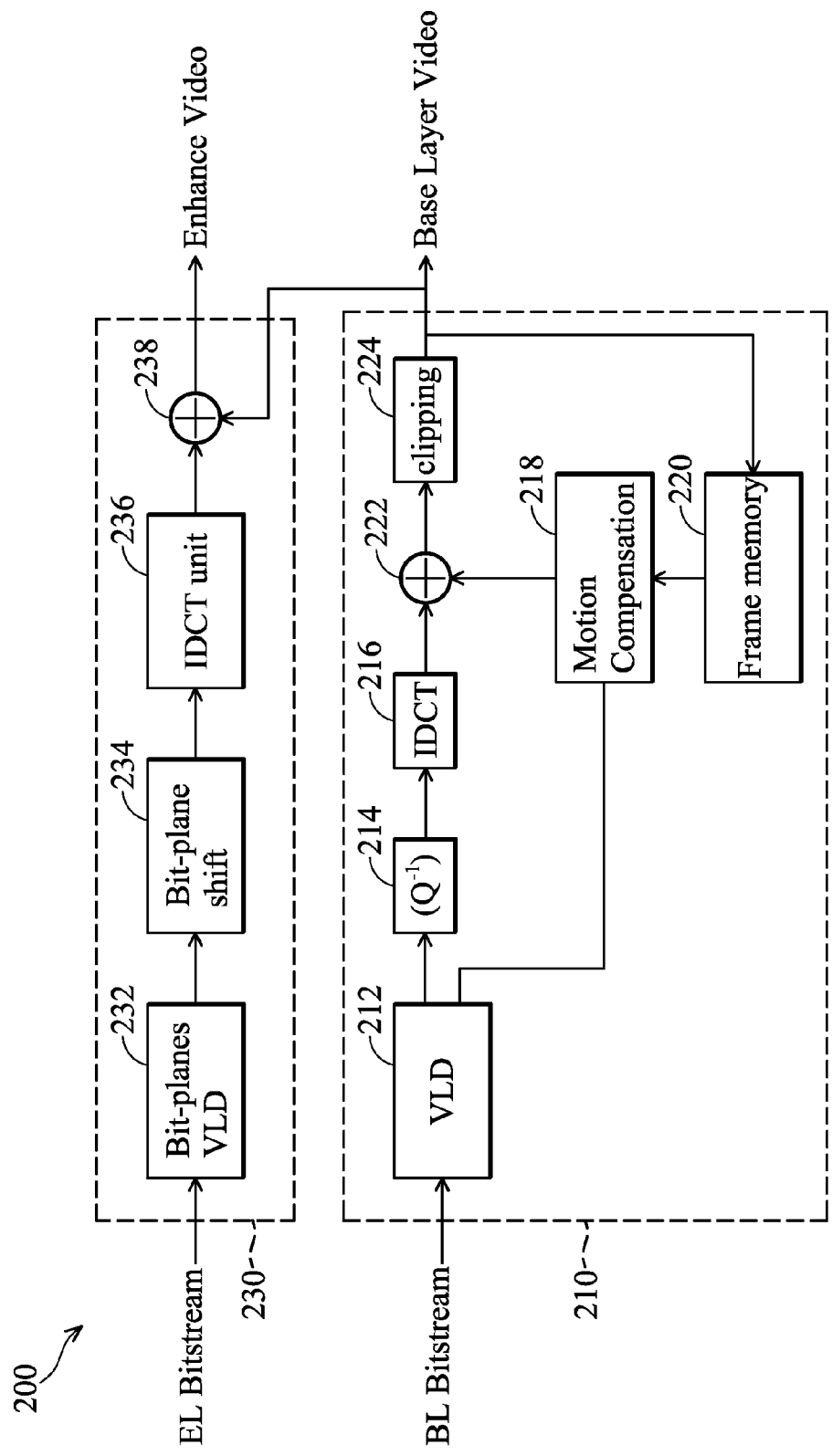
FIG. 2 is a block diagram of a conventional FGS decoding apparatus.

For example, in addition to the JPEG format, the invention can also be applied in any progressively encoded format that arranges variable length encoded data into multiple scans or portions, such as FGS format for video streaming. That is, for layered video data, the rendering flow for decoding the layered video data as shown in FIG. 2 can also be dynamically adjusted according to the performance parameter(s) acquired.

Furthermore, the invention also provides a method for decoding compressed multimedia data, wherein the compressed multimedia data is progressively encoded and comprises a plurality of bitstream portions, such as layered video data. For example, the compressed multimedia data may be JPEG progressively encoded data with multiple scans or FGS encoded data with multiple bit-planes.

Figure 9:
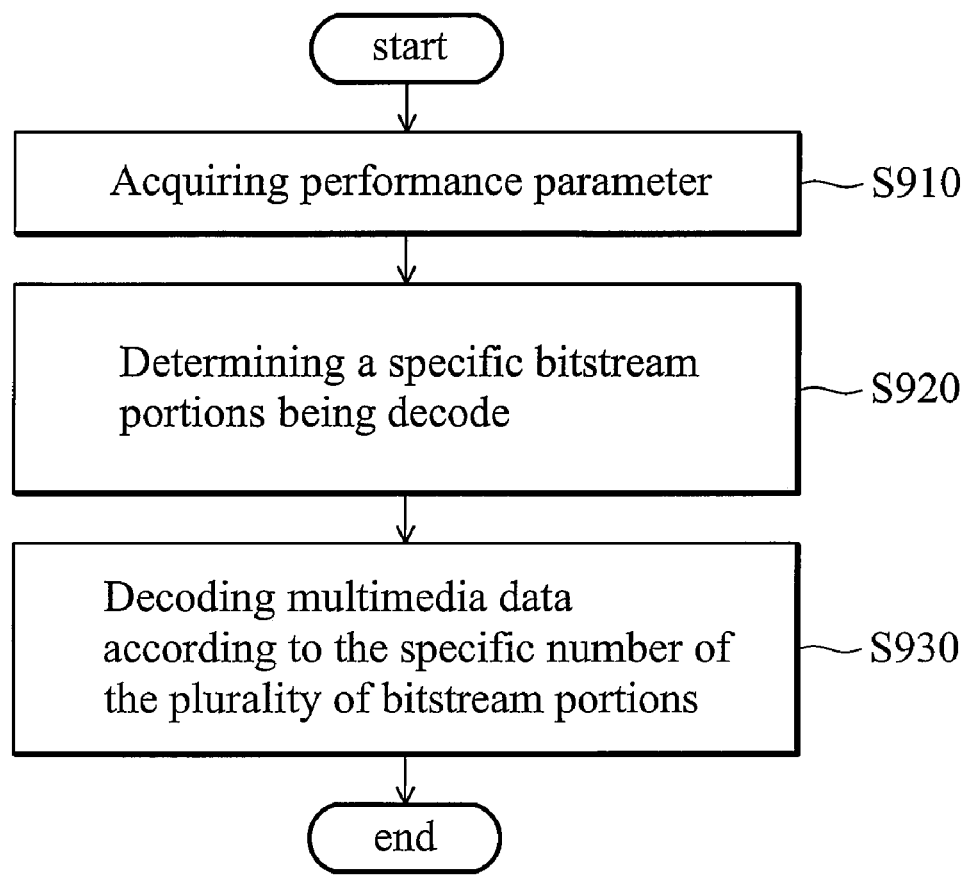
FIG. 9 is a flowchart of another embodiment of a method for decoding compressed multimedia data according to the invention.

FIG. 9 is a flowchart of another embodiment of a method for decoding compressed multimedia data according to the invention. The compressed multimedia data is progressively encoded and comprises a plurality of bitstream portions. In step S910, at least one performance parameter corresponding to a system environment or a display requirement of the compressed multimedia data (e.g. working memory size) is acquired. Subsequently, in step S920, a specific number of the plurality of bitstream portions being decoded is determined dynamically according to at least one performance parameter. Then, in step S930, the compressed multimedia data is decoded according to the specific number of the plurality of bitstream portions being decoded so as to display the decoded data as the image data. For example, if the compressed multimedia data is a layered video data which has 7 bit-planes, a minimum number of the bit-planes (e.g. 5) of the layered video data may be determined most suitable for current system environment status according to the performance parameter, such as available memory size, to reduce the complexity. For example, if the bitstream portions being decoded are determined to be 0, 1, 2, 4, 5, and 7 for a layered video data which has 7 bit-planes, decoding for bit-plane 3 and bit-plane 6 can be skipped, thereby reducing the complexity.

The methods and decoding apparatus described can be stored in the memory of an electronic apparatus (e.g., set top box, DVD player, video recorders, etc.) as a set of instructions to be executed. In addition, the instructions to perform the method and decoding apparatus as described above can alternatively be stored on other forms of machine-readable media, including magnetic and optical disks, for example, on machine-readable media, such as magnetic disks or optical disks, accessible via a disk drive (or computer-readable medium drive). Further, the instructions can be downloaded into a computing device over a data network in a form of compiled and linked version.

Alternatively, the logic to perform the methods and decoding apparatus as discussed, can be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc. Furthermore, the decoding apparatus as described above can be implanted on the same hardware component, such as a graphics controller that may or may not be integrated into a chipset device.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A method for rendering compressed multimedia data, comprising:
   acquiring at least one performance parameter corresponding to a system environment or a display requirement of the compressed multimedia data;
   dynamically determining a rendering flow for the compressed multimedia data according to the acquired performance parameter, wherein the rendering flow comprises a specific arrangement of rendering procedures indicating the execution order of the rendering procedures; and
   decoding the compressed multimedia data with the determined rendering flow so as to display the decoded data as an image data,
   wherein the rendering flow is determined from a plurality of different flowing candidates, and the flowing candidates comprise a one-pass rendering flow and a multi-pass rendering flow and the step of dynamically determining the rendering flow for the compressed multimedia data further comprises selecting the one-pass or the multi-pass rendering flow to determine the rendering flow according to the acquired performance parameter.

2. The method of claim 1, wherein the rendering flow comprises a decoding procedure, a scaling procedure and a transformation procedure.

3. The method of claim 2, wherein the specific arrangement of the rendering procedures for the one-pass rendering flow comprises:
   applying the decoding procedure to the compressed multimedia data for generating a decoded result;
   applying the transformation procedure to the decoded result for generating a transformed result;
   applying the scaling procedure to the transformed result for generating a scaled result; and
   applying the combining procedure to the scaled result for generating the decoded data so as to display the decoded data as the image data.

4. The method of claim 2, wherein the specific arrangement of the rendering procedures for the multi-pass rendering flow comprises:
   applying the decoding procedure to the compressed multimedia data to generate a decoded result;
   applying the combining procedure to the decoded result to generate a summed result;
   applying the transformation procedure to the summed result to generate a transformed result; and
   applying the scaling procedure to the transformed result for generating the decoded data so as to display the decoded data as the image data.

5. The method of claim 1, wherein the performance parameter corresponding to the system environment comprises at least one of a latency of accessing a storage unit storing the compressed multimedia data, a data transfer rate of the storage unit, an available buffer size, a bitstream size, and a decoding time estimated for completing the rendering flows.

6. The method of claim 1, wherein the performance parameter corresponding to the display requirement of the compressed multimedia data comprises at least one of a desired display quality, a scaling factor and a picture size.

7. The method of claim 1, wherein the compressed multimedia data being decoded is encoded progressively based on JPEG standard.

8. The method of claim 1, wherein the compressed multimedia data being decoded is layered compressed video data.

9. The method of claim 1, wherein the compressed multimedia data being decoded is layered compressed video data based on MPEG standard.

10. The method of claim 1, further comprising reading a file comprising the compressed multimedia data from a storage unit.

11. The method of claim 10, wherein the storage unit is a memory within a decoding apparatus or an external removable storage device.

12. The method of claim 1, further comprising reading a file comprising the compressed multimedia data to a decoding apparatus applying the method through a wired or wireless communication network.

13. A decoding apparatus for decoding compressed multimedia data, comprising:
    an information supply unit, providing at least one performance parameter corresponding to a system environment or a display requirement of the compressed multimedia data;
    a determination unit, acquiring the at least one performance parameter corresponding to the system or the display requirement of the compressed multimedia data and dynamically determining a rendering flow for the compressed multimedia data according to the at least one performance parameter, wherein the rendering flow comprises a specific arrangement of rendering procedures indicating the execution order of the rendering procedures and the rendering flow is determined from a plurality of different flowing candidates, and the flowing candidates comprise a one-pass rendering flow and a multi-pass rendering flow; and
    a processing unit, decoding the compressed multimedia data with the determined rendering flow to display the decoded data as an image data,
    wherein the determination unit further selects the one-pass or the multi-pass rendering flow to determine the rendering flow according to the acquired performance parameter.

14. The decoding apparatus of claim 13, further comprising a display unit for displaying the decoded data as the image data.

15. The decoding apparatus of claim 14, wherein the information supply unit further comprises a table for recording the at least one performance parameter.

16. The decoding apparatus of claim 14, wherein the at least one performance parameter corresponding to the system environment comprises an access speed of a storage unit storing the compressed multimedia data, a data transfer rate of the storage unit, an available buffer size, a bitstream size, and a decoding time estimated for completing the rendering flows.

17. The decoding apparatus of claim 14, wherein the at least one performance parameter corresponding to the display requirement of the compressed multimedia data comprises a desired display quality, a scaling factor and a picture size.

18. A method for decoding and displaying compressed multimedia data in a system, the compressed multimedia data being progressively encoded, the method comprising:
    providing a plurality of rendering flows for decoding the compressed multimedia data, each rendering flow having a specific arrangement of the rendering procedures indicating the execution order of the rendering procedures;
    providing at least one performance parameter corresponding to the system or the display requirement of the compressed multimedia data;

dynamically selecting one of the rendering flows according to the at least one performance parameter;
decoding the compressed multimedia data with the selected rendering flow; and
displaying the decoded data in a displaying unit of the system,
wherein the rendering flows comprise a one-pass rendering flow and a multi-pass rendering flow and the step of dynamically selecting one of the rendering flows according to the at least one performance parameter further comprises selecting the one-pass or the multi-pass rendering flow to be the selected rendering flow according to the at least one performance parameter.

* * * * *